D. H. LAPP.
SPRING WHEEL.
APPLICATION FILED MAY 17, 1915.

1,169,042. Patented Jan. 18, 1916.

Witnesses
R. L. Parker

Inventor
D. H. Lapp
by C. A. Snow & Co.
Attorneys

THE COLUMBIA PLANOGRAPH CO., WASHINGTON, D. C.

UNITED STATES PATENT OFFICE.

DAVID H. LAPP, OF ABERDEEN, SOUTH DAKOTA.

SPRING-WHEEL.

1,169,042.     Specification of Letters Patent.     Patented Jan. 18, 1916.

Application filed May 17, 1915. Serial No. 28,663.

*To all whom it may concern:*

Be it known that I, DAVID H. LAPP, a citizen of the United States, residing at Aberdeen, in the county of Brown and State of South Dakota, have invented a new and useful Spring-Wheel, of which the following is a specification.

The device forming the subject matter of this application is a spring wheel and the broad object of the invention is to provide a device of this sort in which pneumatic elements commonly subject to puncture and deterioration may be dispensed with.

Specifically, the invention aims to provide a novel spring and lever construction forming an operative connection between the felly and the rim, whereby the necessary resiliency will be afforded, without resort to pneumatic features.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

Figure 1:
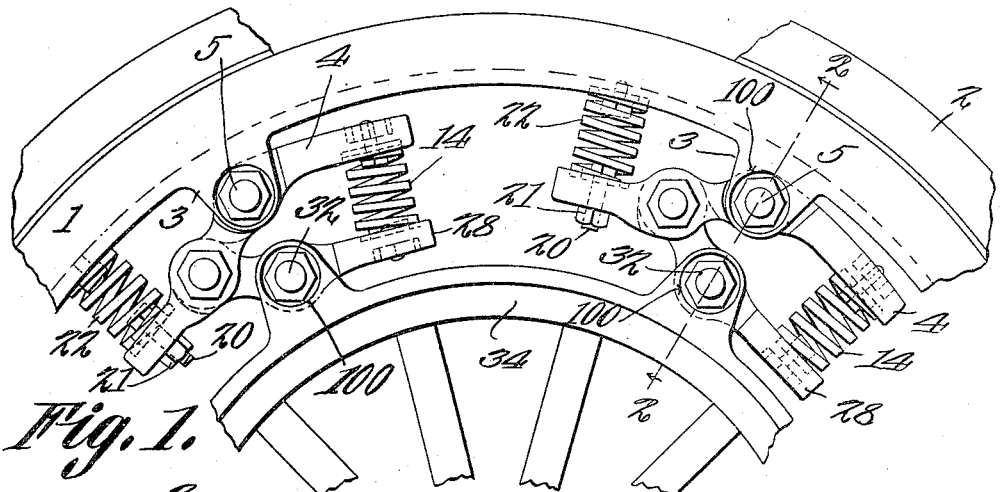
Figures 2, 3:
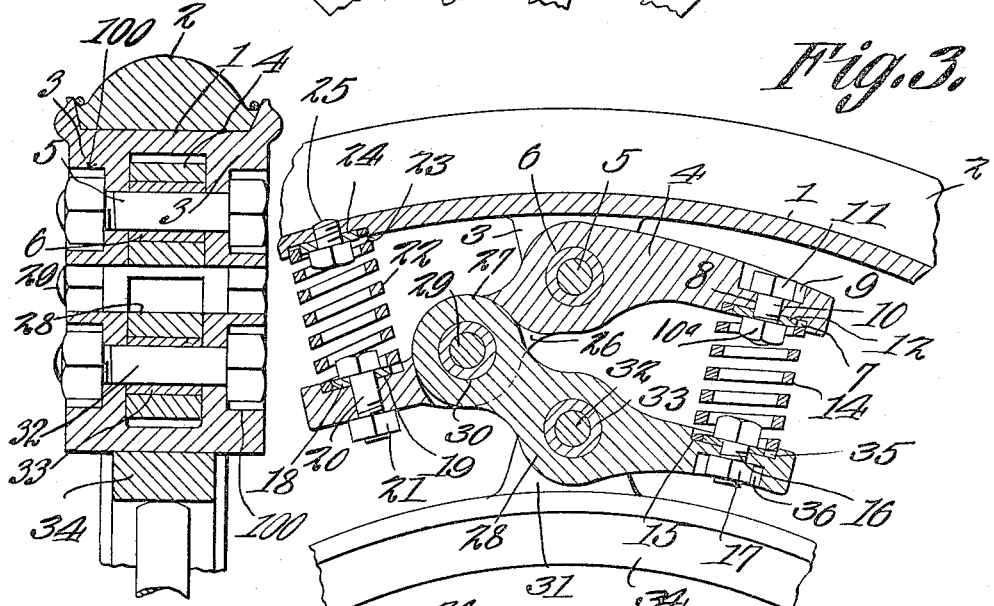
Figure 4:
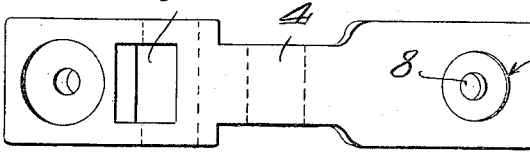
Figure 5:
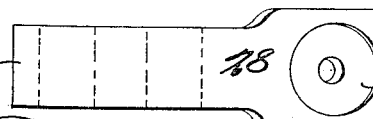

In the accompanying drawing:—Figure 1 shows the invention in fragmental side elevation; Fig. 2 is a cross section on the line 2—2 of Fig. 1; Fig. 3 is a fragmental circumferential section; Fig. 4 is a plan of the primary lever; Fig. 5 is a plan of the secondary lever.

In carrying out the present invention there are provided coöperating elements comprising a rim 1 and a felly 34. The rim 1 carries a tire 2 which may be of any desired construction, the tire preferably being solid since the necessary resiliency is afforded by elements to be described hereinafter.

Disposed circumferentially of the wheel are a plurality of devices whereby resiliency is obtained, and since these devices are duplicates, the description will proceed in the singular number, it being understood that as many devices for obtaining resiliency as is considered expedient or necessary may be employed.

Projecting inwardly from the rim 1 are a pair of ears 3 through which passes a pivot element 5 preferably in the form of a bolt, the pivot element 5 carrying a bushing 6 located between the ears 3. Fulcrumed intermediate its ends on the pivot element 5 and immediately sustained by the bushing 6 for swinging movement in a plane parallel to the median plane of the wheel is a primary lever 4. In its inner face and adjacent one end, the primary lever 4 is provided with a recess 7 communicating with an opening 8 surrounded by a recess 9 located in the outer face of the primary lever. A bolt 10 or other securing element adapted to a like end passes through the opening 8, the head 11 of the bolt being housed in the recess 9. Surrounding the bolt 10 and located in the recess 7 is a washer 12 held in place by the nut 10ª on the bolt 10. One end of a compression spring 14 lies within the contour of the recess 7 and surrounds the periphery of the washer 12, the said end of the spring abutting against one end of the primary lever 4 within the contour of the recess 7. The other end of the spring 14 surrounds a washer 15 located in a recess 35 formed in the outer face of a secondary lever 28. The washer 15 is held in place by a bolt 16, the nut 17 of which is housed in a recess 36 formed in the inner face of the secondary lever 28. In the outer face of the primary lever 4 adjacent the other end thereof is formed a recess 18 receiving a washer 19 held in place by a bolt 20, the nut of which is shown at 21. One end of a compression spring 22 is located in the recess 18 and surrounds a washer 19. The outer end of the spring 22 is received in a recess 23 formed in the rim 1 and surrounds a washer 24 held in the recess 23 by means of a screw 25 or any other suitable means. Intermediate its ends and to one side of its fulcrum 5, the primary lever 4 is provided with an opening 26.

The secondary lever 28 alluded to hereinbefore is carried by a pivot element 32 surrounded by a bushing 33, the pivot element 32 being carried by ears 31 on the felly 34. One end 27 of the secondary lever 28 enters the opening 26 in the primary lever 4 and is connected with the primary lever by means of a pivot element 29 surrounded by a bushing 30.

From the foregoing description it will be obvious that when pressure is applied to the rim 1, the springs 22 and 14 will be compressed, the levers 4 and 28 moving with respect to each other and with respect to the rim and the felly, in order that the springs may exercise their functions.

The ends of the pivot elements 5 and 32 are received in recesses 100 formed respectively in the ears of the felly and the rim, to the end that the pivot elements may not be ripped out or loosened, when the wheel forming the subject matter of this application runs along side of a curb or adjacent an obstacle of any other sort.

Having thus described the invention, what is claimed is:—

1. In a device of the class described, coöperating elements comprising a felly and a rim; a primary lever fulcrumed intermediate its ends on one of said coöperating elements; a secondary lever fulcrumed intermediate its ends on the other of said coöperating elements and pivoted to the primary lever; a spring forming an operative connection between one end of the primary lever and the corresponding end of the secondary lever; and a spring forming an operative connection between the other end of the primary lever and one of said coöperating elements.

2. In a device of the class described, a felly; a rim; a primary lever fulcrumed intermediate its ends on the rim; a secondary lever fulcrumed intermediate its ends on the felly, one end of the secondary lever being pivotally connected to the primary lever adjacent one end of the primary lever; a compression spring interposed between said end of the primary lever and the rim; and a compression spring interposed between the other ends of the levers.

In testimony that I claim the foregoing as my own, I have hereto affixed my signature in the presence of two witnesses.

DAVID H. LAPP.

Witnesses:
 Lew Ryerson,
 G. C. Kettering.

Copies of this patent may be obtained for five cents each, by addressing the "Commissioner of Patents, Washington, D. C."